No. 780,851. PATENTED JAN. 24, 1905.
J. D. WILSON.
COMBINED DISTILLER AND COOKER.
APPLICATION FILED SEPT. 10, 1903.

WITNESSES:
J. J. Coleman
William R. Pitkin

INVENTOR
Joseph D. Wilson
BY
Beach & Fisher
ATTORNEYS

No. 780,851. Patented January 24, 1905.

UNITED STATES PATENT OFFICE.

JOSEPH D. WILSON, OF EAST HAVEN, CONNECTICUT.

COMBINED DISTILLER AND COOKER.

SPECIFICATION forming part of Letters Patent No. 780,851, dated January 24, 1905.

Application filed September 10, 1903. Serial No. 172,666.

*To all whom it may concern:*

Be it known that I, JOSEPH D. WILSON, a citizen of the United States, residing at East Haven, in the county of New Haven and State of Connecticut, have invented certain new and useful Improvements in a Combined Distiller and Cooker, of which the following is a specification.

The object of my invention is to produce a combined distiller and cooker constructed and arranged so as to unite a high degree of simplicity and efficiency; and it consists in the combination and construction of parts hereinafter described and claimed, whereby the operations of cooking and distilling may be carried on at the same time with one apparatus.

Figure 1:
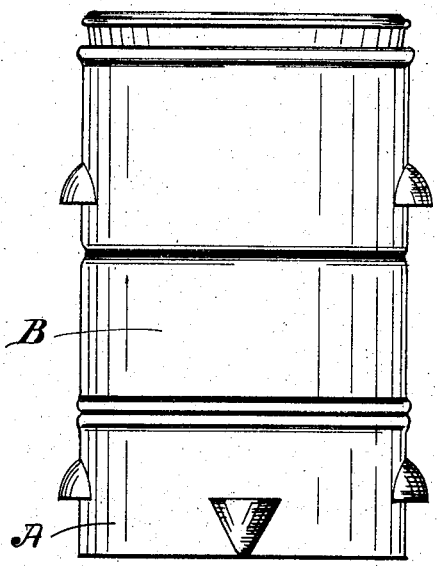
Figure 2:
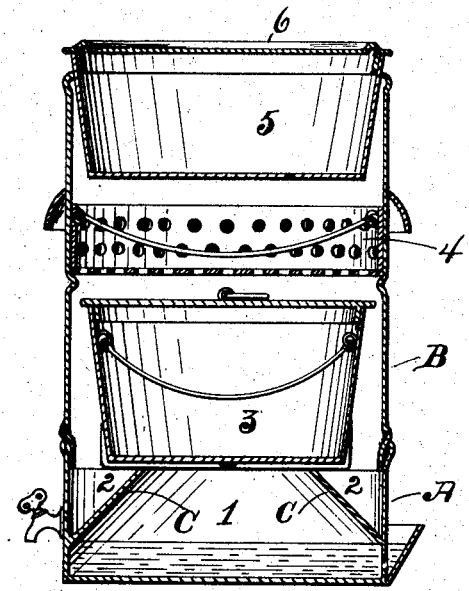
Figure 3:
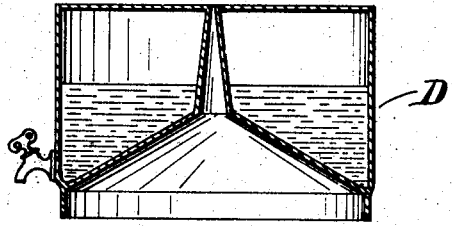

In the drawings, Figure 1 represents an elevation of my improved distiller and cooker; Fig. 2, a vertical cross-section thereof; Fig. 3, a vertical cross-section of an additional condensing device.

Like characters designate corresponding parts.

A is a boiler-section divided into the boiler 1 and the receptacle for distilled water 2 2. The separation is effected by an intercepting cone-shaped diaphragm C C, open at the top, which prevents the water of condensation from returning to the boiler 1, as the smaller end of the conical diaphragm is at the top.

B is the cooking and distilling section, composed of an outer cylindrical shell B, fitted removably in the boiler-section A and containing several cooking utensils 3 4 5, so constructed and arranged with reference to the shell B and the receptacle 2 as to present large surfaces for the condensation of steam and to return the water of condensation freely to the receptacle 2.

D, Fig. 3, shows a cylindrical shell fitted internally with an inverted funnel. With this end in view the bottom of the cooking utensil 3 is made larger in area than the mouth of the diaphragm C, so that it overhangs the same. Said utensil 3 rests on lugs, which support it above the mouth of the diaphragm, and is of such a diameter as to allow free circulation of steam between its side walls and the shell B. It is fitted with a tight cover, which is flat or slightly convex.

Above the utensil 3 and separated from it sufficiently to permit circulation of steam between the two is the utensil 4, which rests on an internal bead in the shell B. The utensil 4, as shown, is an open perforated basket intended for eggs or vegetables. If desired, a tight pan may be substituted; but in that case the bottom edge of the pan must be provided with lugs to raise it from the bead and allow free circulation of steam and return of water.

Above the utensil 4 is a third utensil 5, consisting of a pan which fits into the top of the shell B and acts as a cover thereto and has tapering sides to allow the steam to circulate between it and the sides of the shell. This pan is provided with a cover 6, which when the pan is not used may act as a cover to the shell B. The outer surface of the cover is made flat and is bounded by an upright bead, thus providing a further heating-surface upon which cooking utensils may be placed for warming.

The attachment D may be used after filling it with cold water, as indicated in Fig. 3, by placing it directly on the boiler-section A, which produces a very simple still, or by placing it on top of the cooking and distilling section B after removing the utensil 5. In this position it will very effectively complete the condensation of the steam, which has been partially cooled against the internal walls of section B and the surface of the utensils 3 and 4.

What I claim, and desire to secure by Letters Patent, is—

1. A steam cooking and water-distilling apparatus comprising a vessel having a frusto-conical partition in its lower portion providing a boiling-water space below it and a distilled-water-containing space above it, said frusto-conical partition having a central opening, a condensing device in the upper portion of the said vessel, and cooking vessels removably supported in the said vessel above the opening in the frusto-conical partition, substantially as described.

2. A steam cooking and water-distilling apparatus comprising a receptacle for boiling water, a frusto-conical partition above said receptacle, an outlet for distilled water above said partition, a distilling and cooking section above said partition, and a plurality of vessels, adapted to fit in said distilling and cooking section, the lower of said vessels being constructed and arranged to overhang the inner edge of the partition and drain its surface condensate above said partition, substantially as described.

3. A steam cooking and water-distilling apparatus comprising a vessel having a frusto-conical partition in its lower portion, providing a boiling-water space below it and a distilled-water-containing space above it, said frusto-conical partition having a central opening, a condensing device in the upper portion of the said vessel, and cooking vessels removably supported in the said vessel above the opening in the frusto-conical partition and arranged to drain the condensate occurring on the outer surface thereof into said distilled-water-containing space, substantially as described.

In witness whereof I have hereunto set my hand on the 8th day of September, 1903.

JOSEPH D. WILSON.

Witnesses:
T. P. WILSON,
WILLIAM R. PITKIN.